United States Patent
Van Brero et al.

(10) Patent No.: US 6,912,600 B2
(45) Date of Patent: Jun. 28, 2005

(54) METHOD AND SYSTEM FOR CONTROLLING DEVICES USING A SPECIFIC OR GENERIC DEVICE CONTROL MODULE

(75) Inventors: Koen Gerben Van Brero, Veldhoven (NL); Eduard Gerhard Zondag, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 122 days.

(21) Appl. No.: 10/246,218

(22) Filed: Sep. 18, 2002

(65) Prior Publication Data

US 2003/0061412 A1 Mar. 27, 2003

(30) Foreign Application Priority Data

Sep. 21, 2001 (EP) .............................. 01203588

(51) Int. Cl.$^7$ ............................................. G06F 13/00
(52) U.S. Cl. .............................. 710/8; 710/72; 711/111; 709/223; 370/257
(58) Field of Search .............................. 710/8, 72, 107; 711/111; 709/223, 249; 330/216, 257, 403; 700/19, 245; 345/712; 718/105; 370/316, 257, 463

(56) References Cited

U.S. PATENT DOCUMENTS

| | | | | |
|---|---|---|---|---|
| 6,032,202 A | * | 2/2000 | Lea et al. ....................... | 710/8 |
| 6,052,750 A | * | 4/2000 | Lea ............................... | 710/72 |
| 6,085,236 A | * | 7/2000 | Lea ............................... | 709/220 |
| 6,199,136 B1 | * | 3/2001 | Shteyn ......................... | 710/305 |
| 6,314,447 B1 | * | 11/2001 | Lea et al. ..................... | 718/105 |
| 6,349,352 B1 | * | 2/2002 | Lea ............................... | 710/72 |
| 6,421,069 B1 | * | 7/2002 | Ludtke et al. ............... | 345/762 |
| 6,434,447 B1 | * | 8/2002 | Shteyn ......................... | 700/245 |
| 6,493,753 B2 | * | 12/2002 | Ludtke et al. ............... | 709/223 |
| 6,618,764 B1 | * | 9/2003 | Shteyn ......................... | 709/249 |
| 6,694,363 B1 | * | 2/2004 | Yamadaji et al. ........... | 709/223 |
| 6,768,926 B2 | * | 7/2004 | Webster et al. ............... | 700/19 |
| 2001/0013083 A1 | * | 8/2001 | Nakamura .................. | 711/111 |
| 2002/0120932 A1 | * | 8/2002 | Schwalb ....................... | 725/37 |

* cited by examiner

Primary Examiner—Christopher B. Shin

(57) ABSTRACT

For providing device control and communication for one or more controlled devices in a multi-device network, upon detecting attachment of a new device that is to be controlled by a Device Control Module, such Device Control Module is found and control is assigned to such Device Control Module. In particular, first a Device Control Module is sought that is specific to the new device. In case such specific Device Control Module is not found, the network is probed for existence of a less specific Device Control Module and assigning control of the new device to the less specific Device Control Module.

8 Claims, 2 Drawing Sheets

Figure 1:
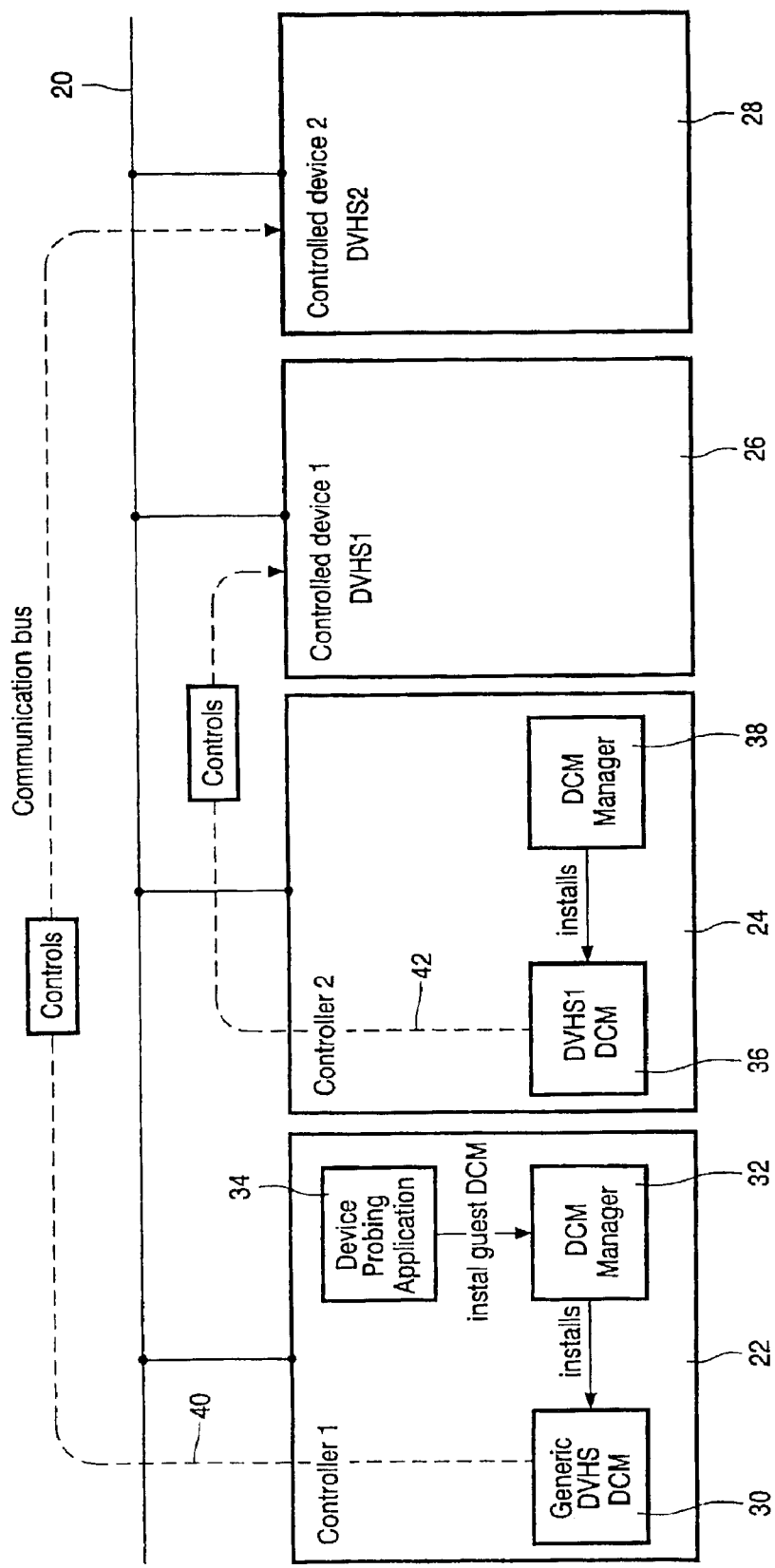

METHOD AND SYSTEM FOR CONTROLLING DEVICES USING A SPECIFIC OR GENERIC DEVICE CONTROL MODULE

The invention relates to a method as recited in the preamble of claim 1.

The invention also relates to a system arranged for implementing a method as recited in the preamble of claim 1.

Increasingly, consumer electronics devices are being interconnected through home networks. Typically, an application running on a first device or station may be able to apply services offered both by the first device and also by other devices. Now, the disclosure to be hereinafter presented of a preferred embodiment, without express or implied limitation is directed to a HAVi environment. In particular, the Home Audio/Video Interoperability (HAVi) standard has been proposed to facilitate the implementation of a Consumer Electronics-based home network on an IEEE1394 bus, which is a wired infrastructure that effectively provides point-to-point interconnections between various devices on the network. In the HAVi organization, there is typically a single Device Control Module (DCM) provided for each device on the network. A DCM for a HAVi controller device will be running a HAVi execution environment and will be installed on the controller device itself. A DCM for a controlled device will not run such environment and will be installed on some controller device in the network other than the controlled device itself. In principle, a controller device may execute more than one Device Control Module for various controlled devices that are present in the network.

Now, in such and other environments, the Device Control Module management system will usually install a Device Control Module for a particular controlled device on a controller device upon detecting the presence in the network of the controlled device, which is typically when the controlled device will become attached to or activated on the network. Thereafter, Device Control Module will remain installed until the controlled device is either deactivated or removed from the network, or until an "uninstall" command, for example through a user person, for that particular Device Control Module will be sent to the Device Control Module management system. At the time when the system must select an appropriate controller device for hosting the Device Control Module of the controlled device, each controller device is given the opportunity to indicate whether or not it can install a Device Control Module for the controlled device in question. However, in the case where multiple controller devices exist that are each able to install a Device Control Module for the new controlled device, the state of the art has offered no possibility to indicate a preferred degree of quality of service by a Device Control Module that is eventually installed.

In fact, typically, a particular controller device will only signal that it can host the new controlled device if it can effectively install any Device Control Module for the specific controlled device or device model. The inventors have recognized a need to cope with the situation where no specific Device Control Module is present in the system for a particular controlled device.

In consequence, amongst other things, it is an object of the present invention to allow running of a controlled device for which no specific Device Control Module is present in the system, even if such running would be at a more or less lower level of quality or efficiency, but wherein a generic Device Control Module would be used that may control a large class of controlled device types or models.

Now therefore, according to one of its aspects the invention is characterized according to the characterizing part of claim 1.

The invention also relates to a multi-station system being arranged for implementing a method as claimed in claim 1. Further advantageous aspects of the invention are recited in dependent claims.

Figure 2:
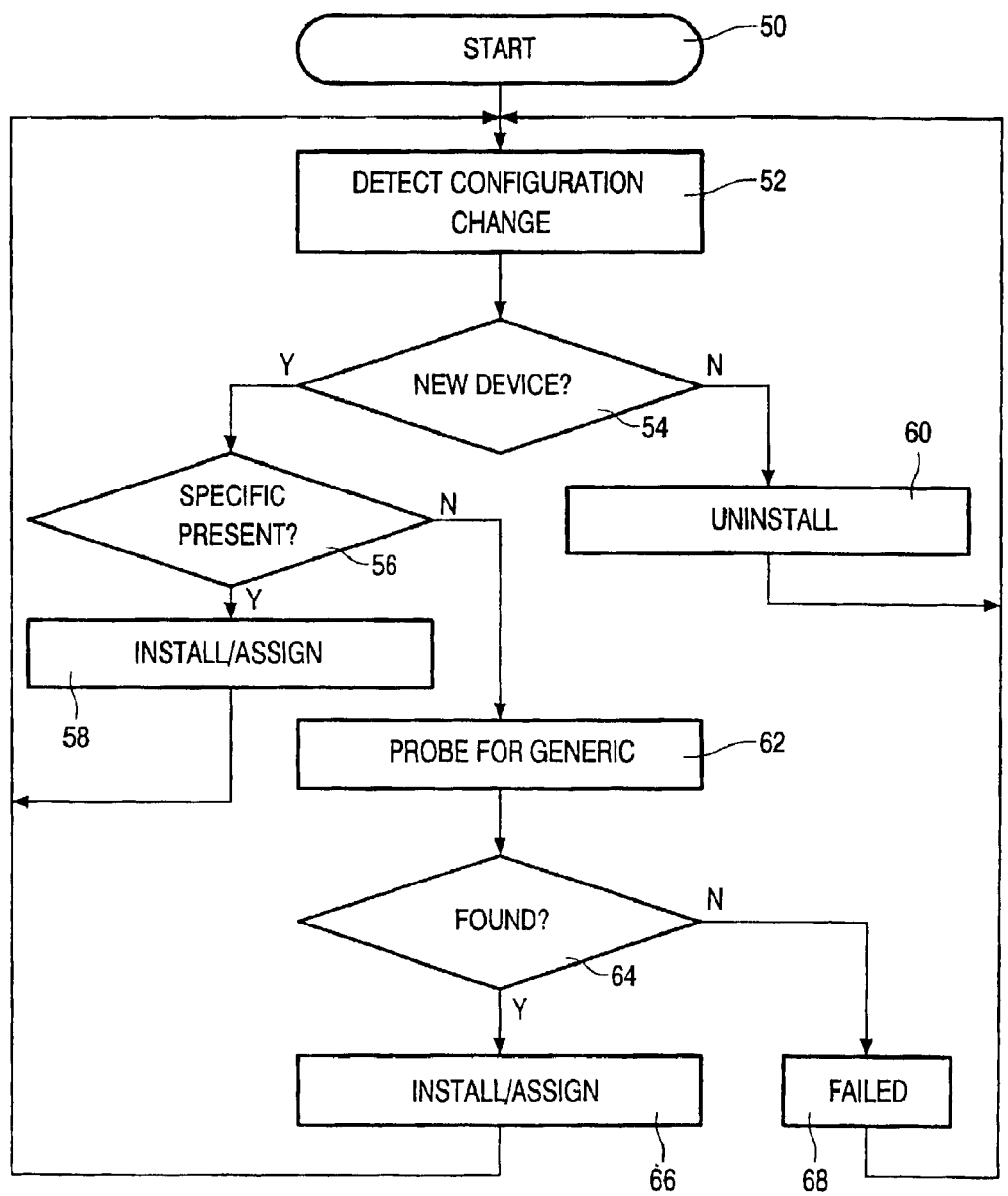

These and further aspects and advantages of the invention will be discussed more in detail hereinafter with reference to the disclosure of preferred embodiments, and in particular with reference to the appended Figures that show:

FIG. 1, a set-up structure of a multiple-station network;

FIG. 2, an operational flow chart for practicing the invention.

FIG. 1 illustrates a set-up structure of a multiple-station network. In this relatively simple embodiment, the intercommunication network is embodied as a communication bus 20, that interconnects two controller stations 22, 24, and two controlled device stations 26, 28. The bus may without express or implied limitation be based on the IEEE 1394 network protocol. This protocol is herein considered state of the art and will in consequence not be discussed extensively. The controlled device stations may in effect represent audio/video consumer products, household appliances, sub-controllers for various household apparatuses such as environment (water, air, lighting) conditioning, gateways to other networks, or even devices in a professional setting such as medical. Likewise, the controller device stations may be appropriate further audio/video consumer products, personal computers, and other.

Now, each controller device comprises a local Device Control Module manager 32, 38 that provides the organizational infrastructure for managing the controlling operations pertaining to the controlled device stations. In particular as shown, controller device 24 has a specific control module DVHS1 Device Control Module, which under enabling by inputs from local manager 38 and through connection 42 that runs on bus 20, exchanges controls with controlled device 26. In this case the control is specifically tailored to the needs and facilities of controlled device 26.

Also furthermore as shown, controller device 22 has a generic control module DVHS DCM, which under enabling by inputs from manager 32 and through connection 40 that runs on bus 20 exchanges controls with controlled device 28. In this case the control is generically approximated to the needs and facilities of a large class of controlled devices of which controlled device 28 is a representative, but for which particular device no specific control module is available. For ascertaining the existence of a generic control module in the system, controller device 22 has available a Device Probing Application or DPA 34 that will search in the system for existence of a generic control module. Inasmuch as there was no specific DCM with respect to controlled device 28, and the DPA 34 found the generic control module 30 with respect to the controlled device 28, the DPA 34 will then activate manager 32 for the installing of generic control module 30 for control of the controlled device 28.

Generally, the specific Device Control Module that is probed for, may be present in system memory means not shown. Alternatively, a Device Control Module may be derived from Internet or from another applicable source entity. This would apply to the generic as well as to the specific module. It should be noted that FIG. 1 illustrates a stationary situation as regards the overall control pattern.

The differences in the level of facilities that the generic versus the specific control module would offer are various.

An optical disc-based device could be controlled in read-only mode by the generic module, whereas the specific module would also allow writing. Also programmability of the read operation, multi-speed driving versus two-speed driving, trick modes, multi-channel operation versus one- or two-channel only, and various other facilities could be offered by the specific control module. Some or all of these facilities could then be absent from the generic control module. Similar aspects would apply in the case of programmable tuners, environmental actuators, medical substations and many other instances. Also non-HAVi systems could implement similar facilities. Another level of quality could relate to the precise matching of commands between the controlled device and the control module so that no conversion would be necessary. On the other hand, a generic control module could effectively control a broader range of controlled device categories or models, such as both disc storage and tape storage devices, or rather a range of both older device versions and newer device versions, etcetera.

In particular, the HAVi DCM management system will indicate through a network-wide event that no Device Control Module could be installed for some controlled device if each controller device has indicated that it has no specific Device Control Module available for the controlled device in question. This situation will according to the present invention now allow a specific application running on a controller device to take alternative action. The earlier HAVi specification did not discuss such alternative actions. The new application is the Device Probing Application DPA referred to supra. A controlled device for which a Device Control Module is to be installed by the Device Control Module management system is called a guest. A controller device that is able to install a Device Control Module for the guest in question is called an actual or potential host.

After the failed installation, according to the present invention, a DPA on some HAVi controller device will investigate whether there is a "second choice" Device Control Module available for the guest in question. This "second choice" DCM, here also referred to as generic, more generic, or less specific DCM, may be located on the own controller device of the DPA or on a remote controller device. If found, the DPA will instruct the HAVi DCM management system to install this Device Control Module for the guest in question. In coordination with the Device Control Module manager on the potential host, it is now indicated during the host selection procedure that the host in question may install this Device Control Module for the guest, and thereafter be selected as a device controller for the guest.

Various variations and extensions to the above are feasible for extending and refining the basic approach of the present invention, as follows:

A particular DPA may communicate with one or more DPAs that are located on one or more other controllers to find the best matching "second choice" generic Device Control Module for a particular guest, which second choice would then also imply the best host.

The selection of a generic Device Control Module may be effected through using a decision tree, wherein the actual model of the controlled device, the existence of broader model categories of the same controlled device, and/or device control protocols may serve as parameters for finding the best Device Control Module candidate. For example, each successive branching of the tree could make a decision as based on a specific subset of the various service parameters, for so rendering the decision process hierarchical and straightforward. Note that the tree need not be binary.

The suitability of a particular Device Control Module for controlling a particular guest device can be built either into the controller device or the DPA, or rather into a Device Control Module itself. For example, a DPA may interrogate a set of DCMs as to the control level or refinement which they can offer to a particular guest. Eventually, the Device Control Module offering the highest degree of control may then be selected. In particular, the DPA could determine respective levels of relevance.

When a generic Device Control Module has been installed for a particular guest device, and subsequently a more specific Device Control Module for that guest device becomes available on the network, then the assigned DPA will uninstall the generic Device Control Module and (re)start the standard Device Control Module management procedure to allow the "better" Device Control Module to be installed for the guest. This could lead to effectively installing the newer one if it is really better than the older one. Alternatively, the older Device Control Module could be retained if the outcome of the selection procedure were to be otherwise.

FIG. 2 illustrates an operational flow chart for practicing the invention. In block 50, the system is activated and the necessary hardware and software facilities are assigned. In block 52, a change of the actual configuration is detected. Effectively but not actually shown as such, this block represents a waiting loop. In block 54, it is detected whether this change pertained to a new controlled device, to a controlled device removal, or to an uninstall command for a Device Control Module. If negative, in block 60 the removal or uninstall is effected, and the system reverts to block 52. If positive however, in block 56 the system checks whether a specific Device Control Module is present for the controlled device in question. If found, in block 58 the Device Control Module is installed and/or assigned to the new controlled device, and the system reverts to block 52. If negative in block 56, in block 62, the Device Probing Application probes for existence of a generic control module. If found (block 64, Y), in block 66 the install/assign operations are effected and the system reverts to block 52. If negative in block 66, the system goes to block 68 for signaling a failure, whereupon a user may take corrective actions or the like, and the system reverts to block 52. Note that the flow chart has been simplified in various degrees, such as in ignoring the leaving of the flow chart.

What is claimed is:

1. A method for controlling one or more controlled devices in a multi-device network, the method comprising the steps of:

detecting the presence in the network of a new device that is to be controlled by a specific device control module for the new device;

assigning control to the specific device control module; and if the specific device control module cannot be determined, probing the network for a generic device control module.

2. The method as claimed in claim 1, wherein upon detecting removal of a particular controlled device the assigning thereto any specific or generic device control module is terminated.

3. The method as claimed in claim 1, wherein upon an uninstall operation with respect to a specific or generic device control module said probing and assigning operations are undertaken as well.

4. The method as claimed in claim 1, wherein a device probing application will communicate with one or more device probing applications located on other controller devices to find a best matching "second choice" generic device control module for a particular guest controlled device, which best matching device control module then would also imply the best host controller device.

5. A method for controlling and communicating one or more controlled devices in a multi-device network, the method comprising the steps of:

detecting the presence in the network of a new device that is to be controlled by a specific device control module for the new device;

assigning control to the device control module; and if the specific device control module cannot be determined, probing the network for a generic device control module, wherein the selection of a generic device control module is based on a decision tree, wherein a model of the device, the existence of broader device models, and/or device control protocols may serve as parameters for finding the best device control module candidate.

6. The method as claimed in claim 1, wherein the suitability of a device control module for controlling a guest controlled device has been built into the controller device or into a device probing application, or into a device control module itself, and allowing the eventual of the device control module that offers the highest degree of control for the guest controlled device in question.

7. The method as claimed in claim 1, wherein a generic device control module has been installed for a particular guest controlled device, and wherein subsequently a more specific device control module for that particular guest controlled device is detected on the network, thereupon uninstalling the generic device control module and (re) starting the standard device control module management procedure to allow the more specific device control module to be installed for the guest controlled device in question.

8. A multi-station system comprising:

one or more device control modules for one or more controlled devices in a multi-device network;

a communication unit for use with the one or more controlled devices;

a processor to detect the presence in the network of a new device that is to be controlled by a specific device control module and assign control to the specific device control module, wherein the system includes a first stage to determine a device control module that is specific for the new device, wherein the first stage has a failure detection output if a specific device control module is not determined for in case such finding is impossible, and a device probing application to probe the network for a generic device control module assigning control of the new device to the generic Device Control Module.

* * * * *